Jan. 22, 1952　　　G. HAUMANN　　　2,583,051
VENEER CLIPPER

Filed March 13, 1948　　　13 Sheets-Sheet 1

INVENTOR.
GEORGE HAUMANN
BY Kwis, Hudson,
Boughton & Williams
ATTORNEYS

Jan. 22, 1952 G. HAUMANN 2,583,051
VENEER CLIPPER
Filed March 13, 1948 13 Sheets-Sheet 4

INVENTOR.
GEORGE HAUMANN
BY
Kwis, Hudson, Boughton & William
ATTORNEYS

Jan. 22, 1952  G. HAUMANN  2,583,051
VENEER CLIPPER
Filed March 13, 1948  13 Sheets-Sheet 5

INVENTOR.
GEORGE HAUMANN
BY
Kwis, Hudson, Boughton & Williams
ATTORNEYS

Jan. 22, 1952
G. HAUMANN
2,583,051
VENEER CLIPPER
Filed March 13, 1948
13 Sheets-Sheet 8
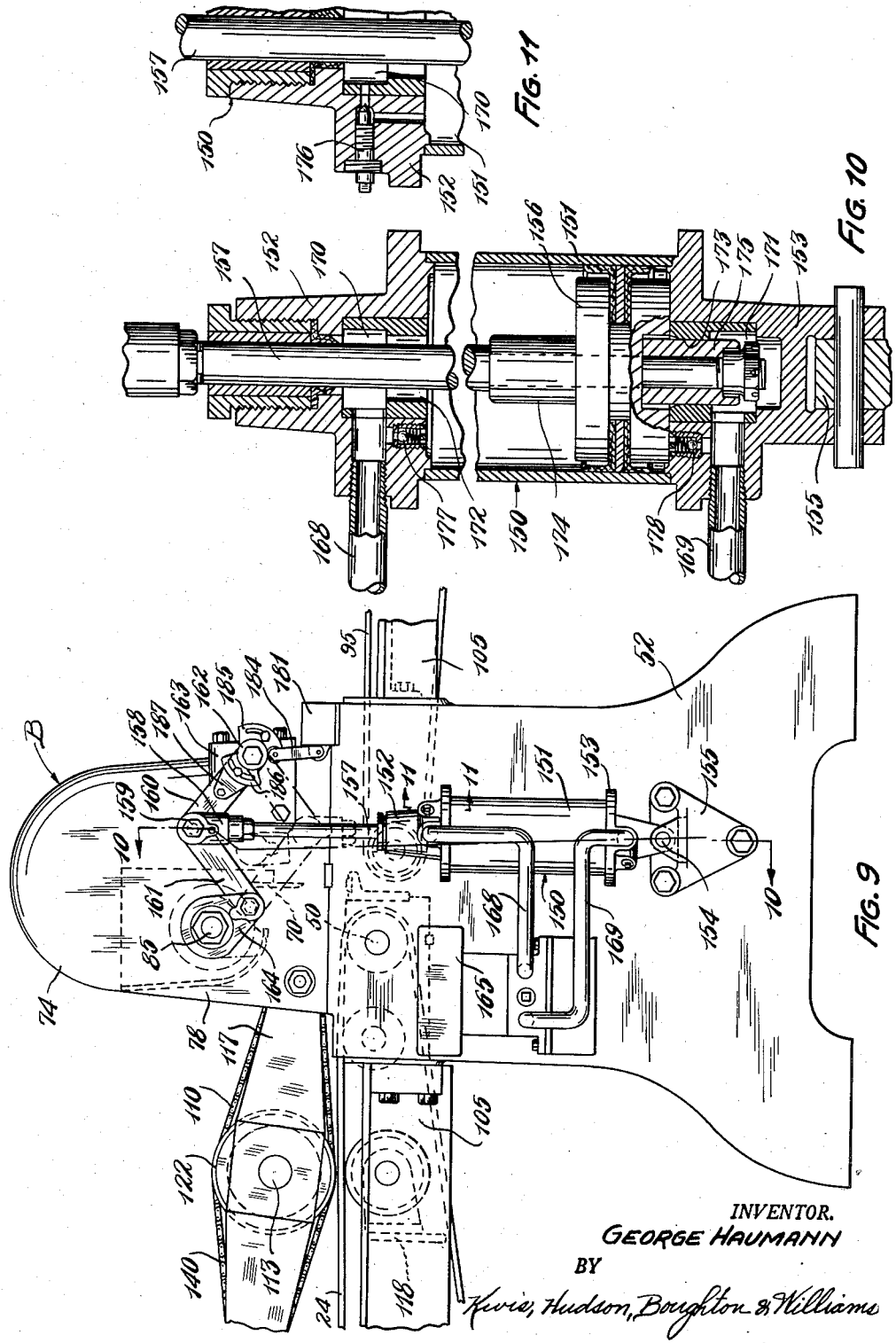
INVENTOR.
GEORGE HAUMANN
BY
Kevis, Hudson, Boughton & Williams
ATTORNEYS

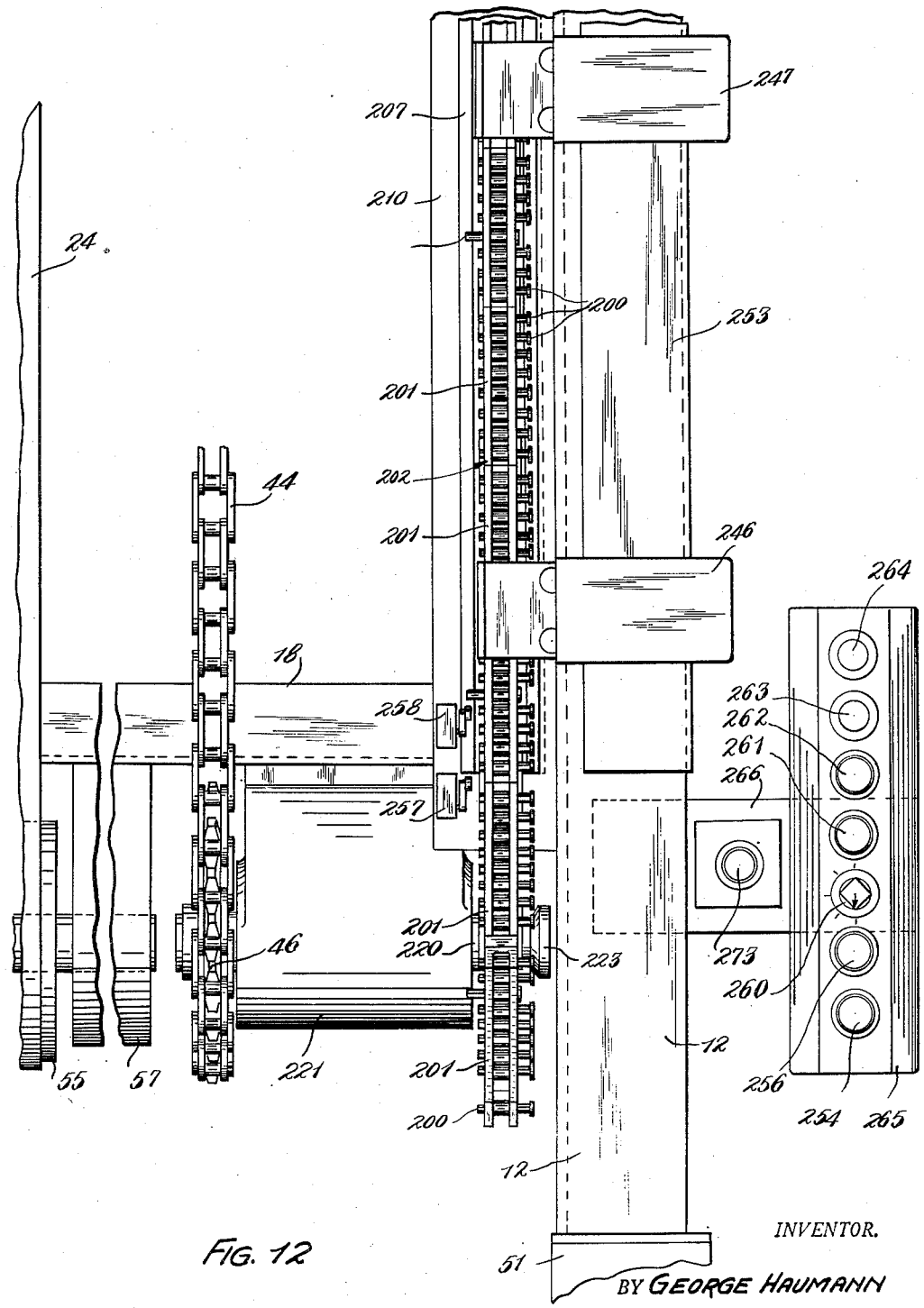

Jan. 22, 1952 G. HAUMANN 2,583,051
VENEER CLIPPER

Filed March 13, 1948 13 Sheets-Sheet 10

INVENTOR.
GEORGE HAUMANN
BY Kwis, Hudson
Boughton & Williams
ATTORNEYS

Jan. 22, 1952     G. HAUMANN     2,583,051
VENEER CLIPPER

Filed March 13, 1948                                13 Sheets-Sheet 11

INVENTOR.
BY GEORGE HAUMANN
ATTORNEYS

Jan. 22, 1952

G. HAUMANN 2,583,051

VENEER CLIPPER

Filed March 13, 1948

INVENTOR.
GEORGE HAUMANN
BY Kwis, Hudson, Boughton & Williams
ATTORNEYS

Jan. 22, 1952             G. HAUMANN             2,583,051

VENEER CLIPPER

Filed March 13, 1948                                     13 Sheets-Sheet 13

INVENTOR.
GEORGE HAUMANN
BY Kwis, Hudson,
Boughton & Williams
ATTORNEYS

Patented Jan. 22, 1952

2,583,051

UNITED STATES PATENT OFFICE 2,583,051

VENEER CLIPPER

George Haumann, Portland, Oreg., assignor to The Coe Manufacturing Company, Painesville, Ohio, a corporation of Ohio Application March 13, 1948, Serial No. 14,681

14 Claims. (Cl. 164—49)

The present invention relates to cutting machines and, more particularly, to machines used to cut or clip sheets of veneer into sections usually of predetermined standard width. In the veneer industry, these machines are commonly called "clippers" or "veneer clippers."

In the manufacture of veneer, it is desirable to cut or clip the continuously moving sheet of veneer as it comes from the veneer lathe or "peeler" into predetermined standard widths of 24", 30", 36", 42" and 48". If all of the veneer was usable, the design and construction of a satisfactory machine for this purpose would not present any great problem; however, the veneer is not all usable. The presence of knots and like defects necessitates cutting out defective parts and continuous, manual selection of the standard width to be cut so that the greatest number of sections of maximum width can be cut from any given strip of veneer. In the event that the defect is comparatively small, it is only necessary to cut out a comparatively narrow section or strip in order to eliminate the defect, which necessitates the making of two cuts in quick succession in the relatively rapidly traveling sheet of veneer.

The principal object of the present invention is the provision of a veneer clipper of novel and improved design for clipping a continuously moving strip of veneer, which clipper comprises a relatively light-weight mechanism for carrying the knife, which mechanism is slidably supported by a relatively heavy frame member so as to assure accuracy, in combination with power means for reciprocating the knife, and capable of moving it at such a high speed that the knife will not materially interfere with the continuous movement of the veneer.

Another object of the invention is the provision of a veneer clipper of the character referred to comprising novel and improved means for controlling the clipping operation whereby defective sections can be accurately cut from a continuously moving sheet or strip of veneer, or succeeding portions of the veneer strip can be cut into the same or different standard size sections.

Another object of the invention is the provision of a novel and improved veneer clipper of the character referred to comprising means for automatically cutting a continuously moving sheet of veneer into sections of standard width.

The invention resides in certain constructions and combinations and arrangements of parts and further objects and advantages will be apparent to those skilled in the art from the following description of the preferred embodiment described with reference to the accompanying drawings forming a part of the specification in which similar reference characters designate corresponding parts, and in which:

Fig. 9 is an enlarged, fragmentary, side elevational view of the clipper proper, looking from the rear, as viewed in Figs. 1 and 3;

Fig. 10 is an enlarged, fragmentary sectional view approximately on the line 10—10 of Fig. 9;

Fig. 11 is an enlarged, fragmentary sectional view approximately on the line 11—11 of Fig. 9;

Fig. 12 is an enlarged, fragmentary plan view showing part of the control mechanism for actuating the clipper proper;

Figure 1:
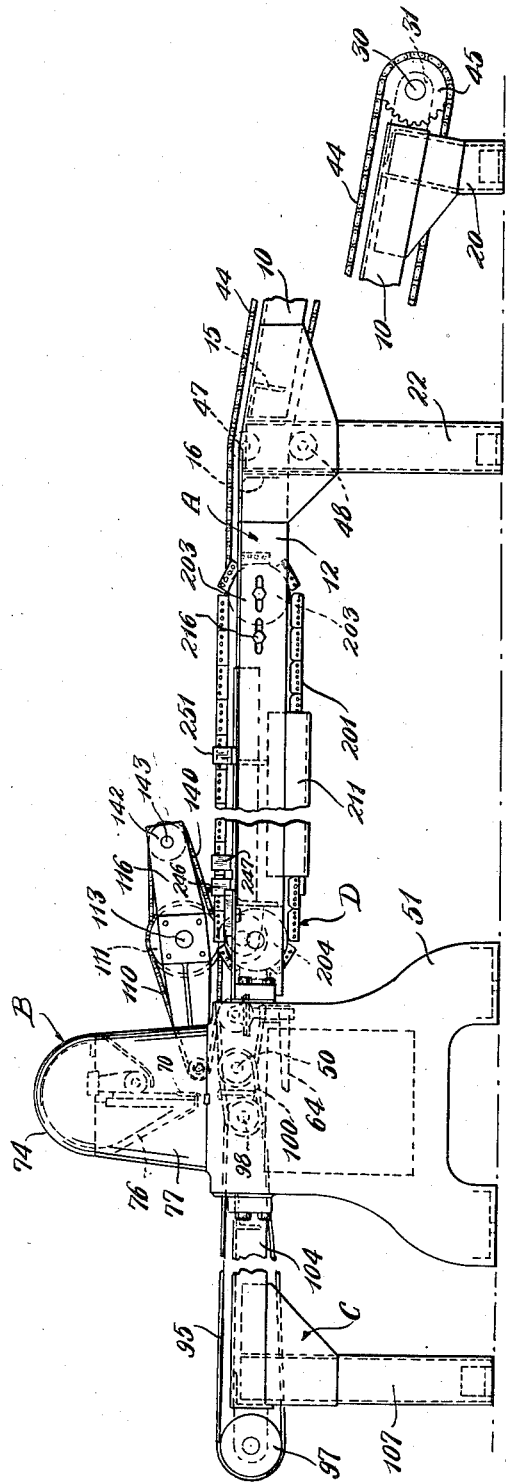
Fig. 1 is a fragmentary side view of a veneer clipper embodying the present invention.

Generally speaking, the clipper shown comprises a feed table, designated by the reference character A, adapted to receive veneer to be clipped from a veneer lathe or some other suitable machine; a clipper proper, designated by the reference character B, adapted to receive and clip the veneer fed thereto by the feed table A; a run-out table C for carrying the clipped veneer away from the clipper proper; and a control mechanism, designated by the reference character D, for controlling the actuation of the knife of the clipper. The feed table A and the run-out table C are made of welded-up, structural shapes and plates and may be of any suitable size, depending upon the width of the veneer to be handled and the absence or presence of other conveyor mechanism for transferring the veneer from the veneer lathe to the clipper. The right-hand part of the table is inclined upwardly from the right, as shown in Fig. 1, and the right-hand end thereof, which is relatively low, is adapted to be positioned adjacent to the veneer lathe so that it can receive the veneer directly from the lathe.

The frame of the feed table comprises suitable side and transverse structural members 10, 11, 12, 13, 14, 15, 16, 17 and 18, respectively, welded or bolted together, and to leg members 20, 21, 22, 23. The leg members 20, 21 are at the right-hand end of the table, as viewed in Figs. 1 and 2, and the leg members 22 and 23 are adjacent to the middle of the table. The left-hand end of the table is supported on the clipper proper. The table proper comprises a plurality of flexible, continuous belts 24 encircling suitable pulleys 25, 26 located at opposite ends of the table. The pulleys 25 are keyed to a transversely extending shaft 30 journaled in bearing brackets 31 bolted or otherwise secured to the transverse frame member 14. The shaft 30 is adapted to be driven by an electric motor 32 connected to the shaft 30 by a remote control, variable speed drive 33; for example, a Reeves variable speed drive having a motor 34 for varying the speed of the drive. The control for the motor 34 is preferably a reversing, pedal-operated, floor switch 35 located at the operator's position, hereinafter referred to.

A roller 40 supported in suitable bearing brackets 41 connected to vertical plate members 42 welded to the transverse frame member 16 and the leg members 22, 23 supports the upper reaches of the belts 24 at the point where they change to a horizontal position. The return reaches of the belts are supported by a similar roller 43 supported in a similar manner. The rollers 40, 43 may be of any desired construction. As shown, they comprise cylindrical, tubular sleeves fixed upon transverse shafts. The rollers may be driven, if desired, as by the timing sprocket chain 44 encircling a sprocket wheel 45 on the front end of the shaft 30, as viewed in Figs. 1 and 2, and a sprocket wheel 46 located adjacent to the clipper proper. The sprocket chain rides over and engages sprockets 47, 48 on the reduced front ends of the rollers 40, 43. The pulleys 26 are keyed to a transversely extending shaft 50 which may be considered a part of the clipper proper and which extends between the side frames 51, 52 of the clipper. The shaft 50 is rotatably supported in suitable bearing brackets 53 bolted to the top of a transversely extending T-member 54 extending between the side frames 51, 52 and bolted thereto.

The upper reaches of the belts 24 are supported adjacent to the clipper proper by two rollers 55, 56, the first of which is carried by suitable bearing brackets 57, 58 bolted to the forward sides of the transversely extending frame member 18. The roller 56 is supported in suitable bearings 60, 61, one at each end, fixed to the upper ends of threaded members 62, 63 projecting downwardly through bosses formed in brackets 64, 65 bolted to the member 54. The members 62, 63 are provided with nuts 66 abutting the upper ends of the bosses and provide means for adjusting the height of the roller 56. The roller 56, hereinafter called the "hump-up" roller, is normally so positioned that it is slightly higher than the pulleys 26, the roller 55, and the upper surface of the members 88, 91, with the result that the upper reaches of the belts and the veneer carried thereby are humped-up between the roller 55 and the pulleys 26 on the member 88.

The knife 70, which has its lower end beveled on the side facing the direction from which the veneer is fed, is relatively light in weight, is detachably connected as by screws 71 to the lower ends of vertically positioned members 72 slidably supported upon the front face of a knife bar 73 formed as a part of an integral casting 74, including a transversely extending, hollow, semi-cylindrical top section 75; a transversely extending, inclined portion 76; and two end members 77, 78. The members 72, of which there are any desired number depending upon the width of the clipper, are slidably supported on the knife bar 73 for vertical reciprocation by guide members 80, 81 detachably bolted to the right-hand face of the knife bar by bolts 82. The upper ends of the members 72 are provided with rack teeth 83 and are adapted to be simultaneously reciprocated to reciprocate the knife 70 by gear wheels 84 keyed to a transversely extending shaft 85. The shaft 85 is rotatably supported in the end members 77, 78 of the knife bar casting and in bearing brackets 86 bolted to the face of the knife bar proper 73.

Figures 4, 5:
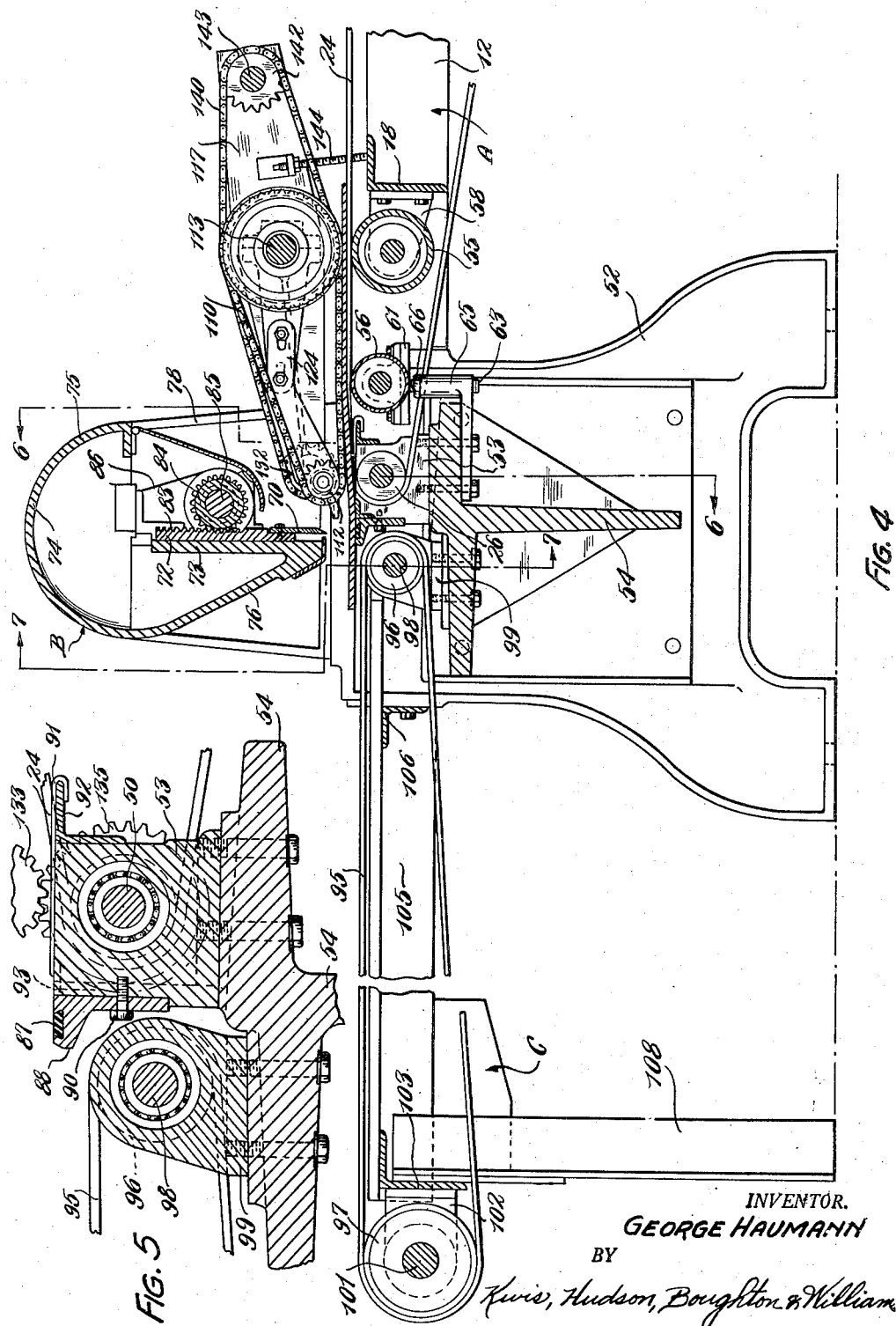
Fig. 4 is a sectional view approximately on the line 4—4 of Fig. 2.
Fig. 5 is a fragmentary sectional view approximately on the line 5—5 of Fig. 6.
Figure 6:
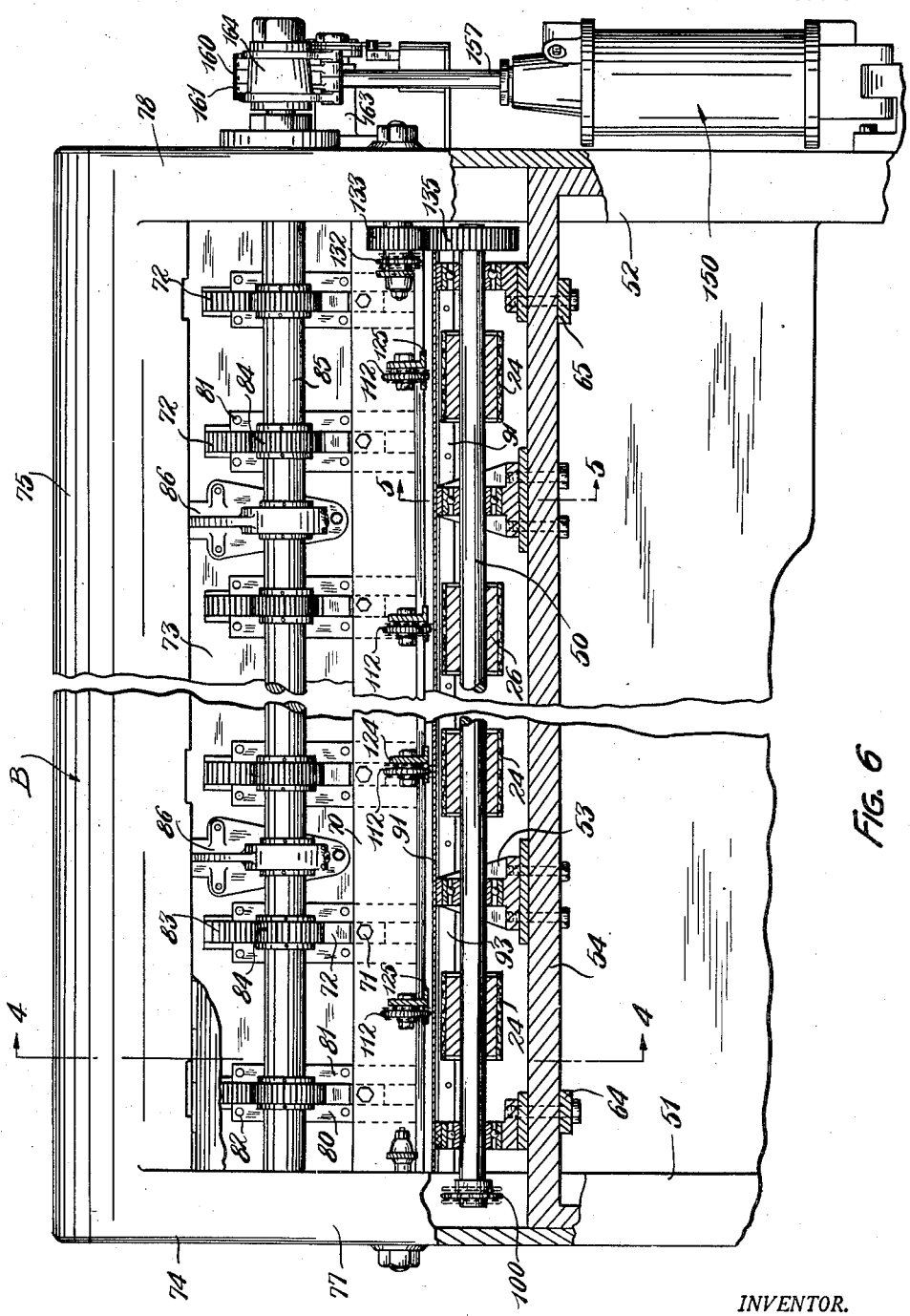
Fig. 6 is a fragmentary sectional view approximately on the line 6—6 of Fig. 4.
Figure 7:
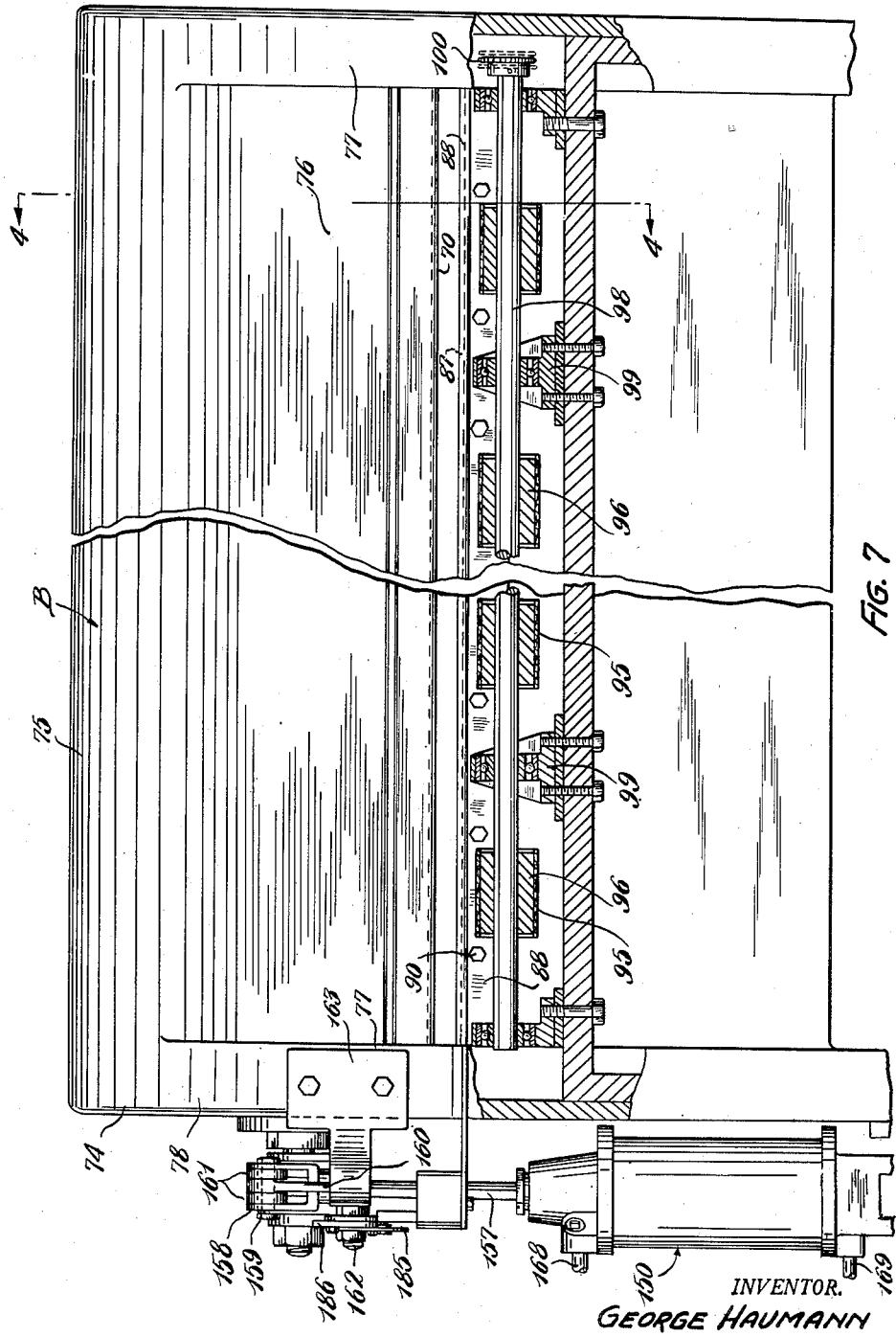
Fig. 7 is a fragmentary sectional view approximately on the line 7—7 of Fig. 4.
Figure 8:
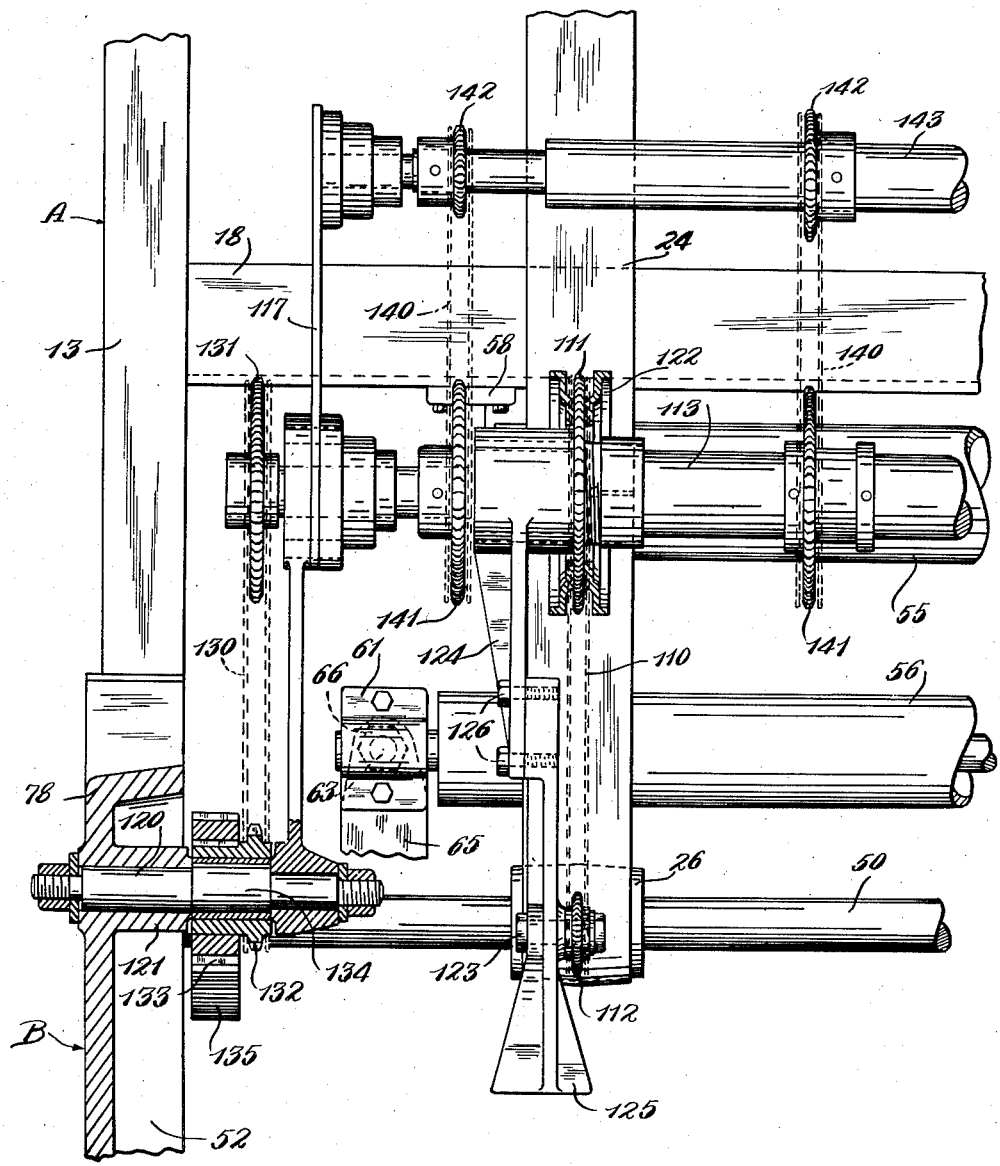
Fig. 8 is an enlarged, fragmentary plan view, with portions in section, of the hold-down mechanism.

The knife 70, when in its lower position, contacts a lead insert 87 in the upper surface of an annularly-shaped member 88 extending across the clipper and fixedly bolted to the upper left-hand faces of the bearing members 53 which are cut out slightly to receive the member 88, as by bolts 90. A sheet metal shield 91 resting upon the bearing brackets 53 forms a continuous support for the veneer to be clipped as it approaches the knife. The right-hand end of the shield 91, as viewed in Fig. 5, is clamped about an angle iron 92 bolted to the right-hand sides of the bearing brackets 53 and the left-hand end of the shield is supported between the bearing brackets by angle irons 93 extending between the bearing brackets and connected to the right-hand side of the member 88. The shield 91 is provided with suitable cut-outs to permit the belts 24 to pass therethrough.

Figure 2:
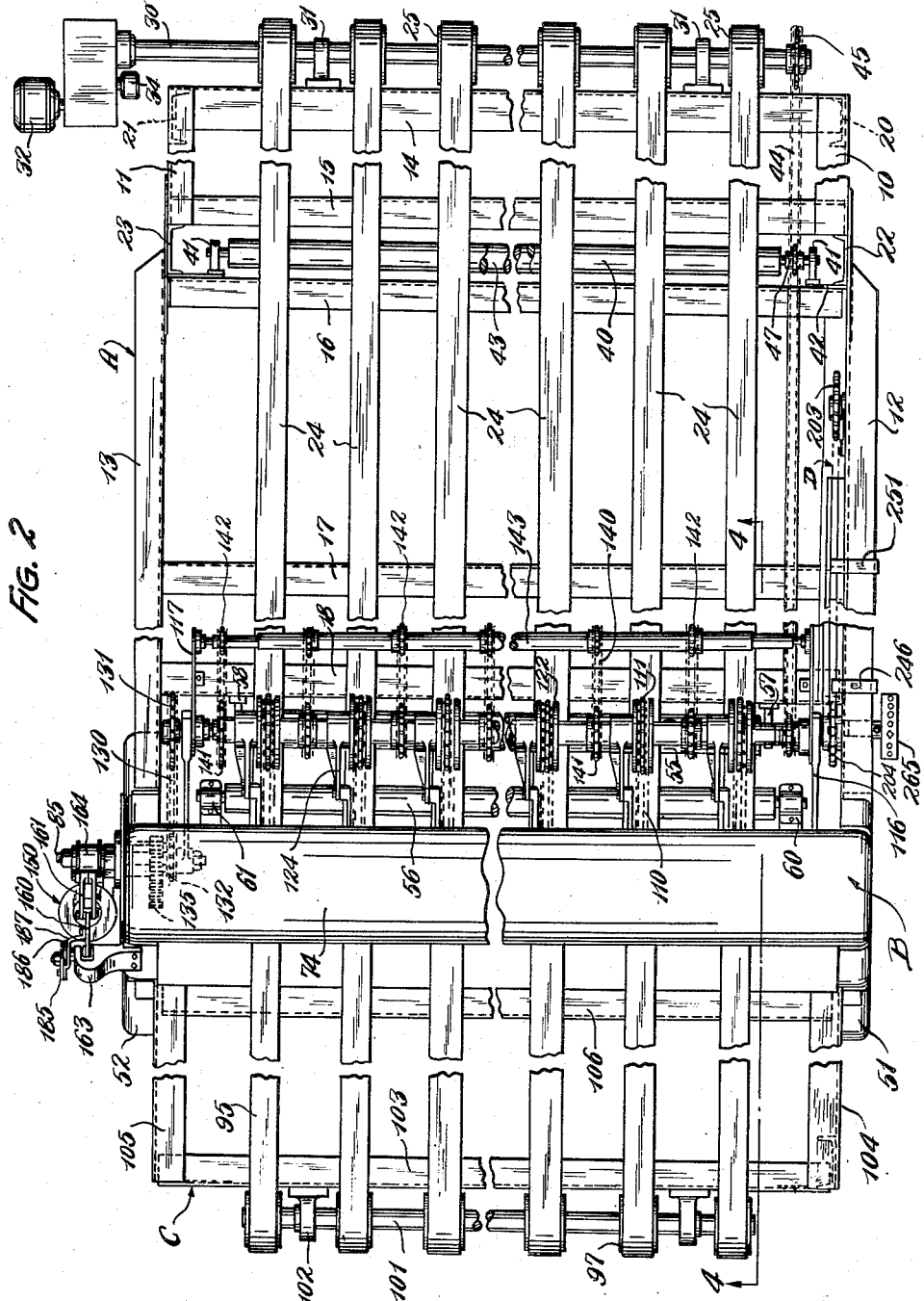
Fig. 2 is a fragmentary plan view of the veneer clipper shown in Fig. 1.

The run-out table proper comprises a plurality of belts 95 similar to the belts 24, previously referred to, surrounding pulleys 96, 97 located adjacent to the stationary member 88 and, at the left-hand end of the run-out table, the pulleys 96 are keyed to a transversely extending shaft 98 rotatably supported in suitable bearing brackets 100 detachably bolted to the top of the left-hand part of the bed 54. The shaft 98 and, in turn, the belts 95 are driven from the shaft 50 through a sprocket chain drive, designated by the reference character 100, located within the member 77 and operatively connected to the front ends of the shafts 50, 98, as viewed in Figs. 1 and 3. The pulleys 97 are keyed to a transversely extending shaft 101 supported in bearing brackets 102 bolted to a transverse member 103 of the frame of the bed proper. The frame of the run-out table C includes suitable side members 104, 105 connected to a transverse member 106 extending between the side housings 51, 52 and to the transverse member 103. The left-hand end of the run-out table C, as viewed in Figs. 2 and 4, is supported by leg members 107, 108 welded to the transverse member 103 and the side members 104, 105.

As the veneer approaches the cutting position, the feeding effect of the belts 24 is assisted by a hold-down mechanism including a plurality of sprocket chains 110 surrounding sprocket wheels 111, 112. The sprocket wheels 111 are adjustably connected to a transversely extending shaft 113 supported by a plurality of bearings fixed to longitudinally extending side arms 116, 117 midway between the ends thereof, the forward ends of which arms are pivoted to short shafts 120 adjustably fixed in bosses 121 in opposite side members 77, 78. The shaft 113 is preferably positioned directly above the roller 55. The construction is such that the side arms 116, 117 are free to pivot about the shafts 120 as an axis and cause the sprocket chains 110, of which there is one for each belt 24, to engage the belt or press the veneer against the upper reach of the belt, as the case may be. In order to prevent the sprocket wheels 111 from cutting the belts 24 when there is no veneer passing underneath the sprocket wheels, each wheel is provided with one or two annular flanges 122, the radial outer parts of which extend slightly beyond the ends of the sprocket teeth and ride upon the belts 24 in place of the sprocket teeth. The sprocket wheels 112 are rotatably supported upon suitable bearings secured by bolts 123 to the projecting ends of arms 124, the free ends of which 125 project adjacent to the knife 70. The right-hand ends of the arms 124, as viewed in Fig. 4, are pivotally supported upon the shaft 113. The arms are made in two parts adjustable relative to each other by the cap screws 126 so that the free ends of the arms may be adjusted closer to or further away from the knife 70 as desired. The construction is such that in the event the veneer humps up in front of the knife 70, the arms 124 are free to pivot about the shaft 113 and the shaft 113 is free to rotate about the pivots 120, thus allowing the sprocket chains 110 to raise causing minimum damage, if any, to the veneer.

The shaft 113 is driven by a sprocket chain 130 connected to a sprocket wheel 131 fixed to the rear end of the shaft 113 and a sprocket wheel 132 formed integral with a small pinion 133 and rotatably supported upon an eccentric portion 134 of the rear shaft 120. The pinion 133 is continuously in mesh with a gear 135 fixed to the transversely extending shaft 50, previously referred to, and which shaft is continuously driven from the shaft 30 by the belts 24. The fact that the portion 134 of the shaft 120 at the rear of the machine upon which the sprocket wheel 132 and the pinion 133 are rotatably supported is eccentric, allows for limited adjustment of the gears 133, 135 relative to each other.

In some instances, the leading end of a sheet of veneer is curled slightly upward as it approaches the clipper proper, and the present invention provides means for straightening out the veneer and feeding it to the space intermediate the upper reaches of the belts 24 and the lower reaches of the sprocket chains 110. As shown, this means comprises a plurality of sprocket chains 140 encircling sprocket wheels 141, 142. The sprocket wheels 141 which are of slightly less diameter than the sprocket wheels 111, are keyed to the shaft 113 midway between adjacent sprocket wheels 111. The sprocket wheels 142 are keyed to a transversely extending shaft 143 extending between and rotatably supported in the free right-hand ends of the longitudinally extending side members 116, 117. The centers of the sprocket wheels 111, 132, 142 are substantially aligned, with the result that the sprocket wheels 142, which are of less diameter than the sprocket wheels 141, and the right-hand ends of the sprocket chains 140 are raised above the belts 24 since the sprocket wheels 111 are of relatively large diameter. The shaft 113 is driven from the shaft 50, as previously pointed out, and the relative size of the sprocket wheels 111, 141, 142 is such that the sprocket chains 140 are driven in such a manner that the travel thereof in feet per minute exceeds that of the belts 24. As a result, a curled end of a sheet of veneer approaching the clipper proper is pulled forwardly and downwardly by the lower reaches of the sprocket chains 140 and fed between the upper reaches of the belts 24 and the lower reaches of the sprocket chains 110. If desired, movement of the hold-down mechanism toward the belts 24 may be limited by an adjustable stop, such as, the threaded member 144 adjustably connected to the side arm 117, the lower end of which member is adapted to engage the top of the angle iron 18 of the feed table.

Figure 3:
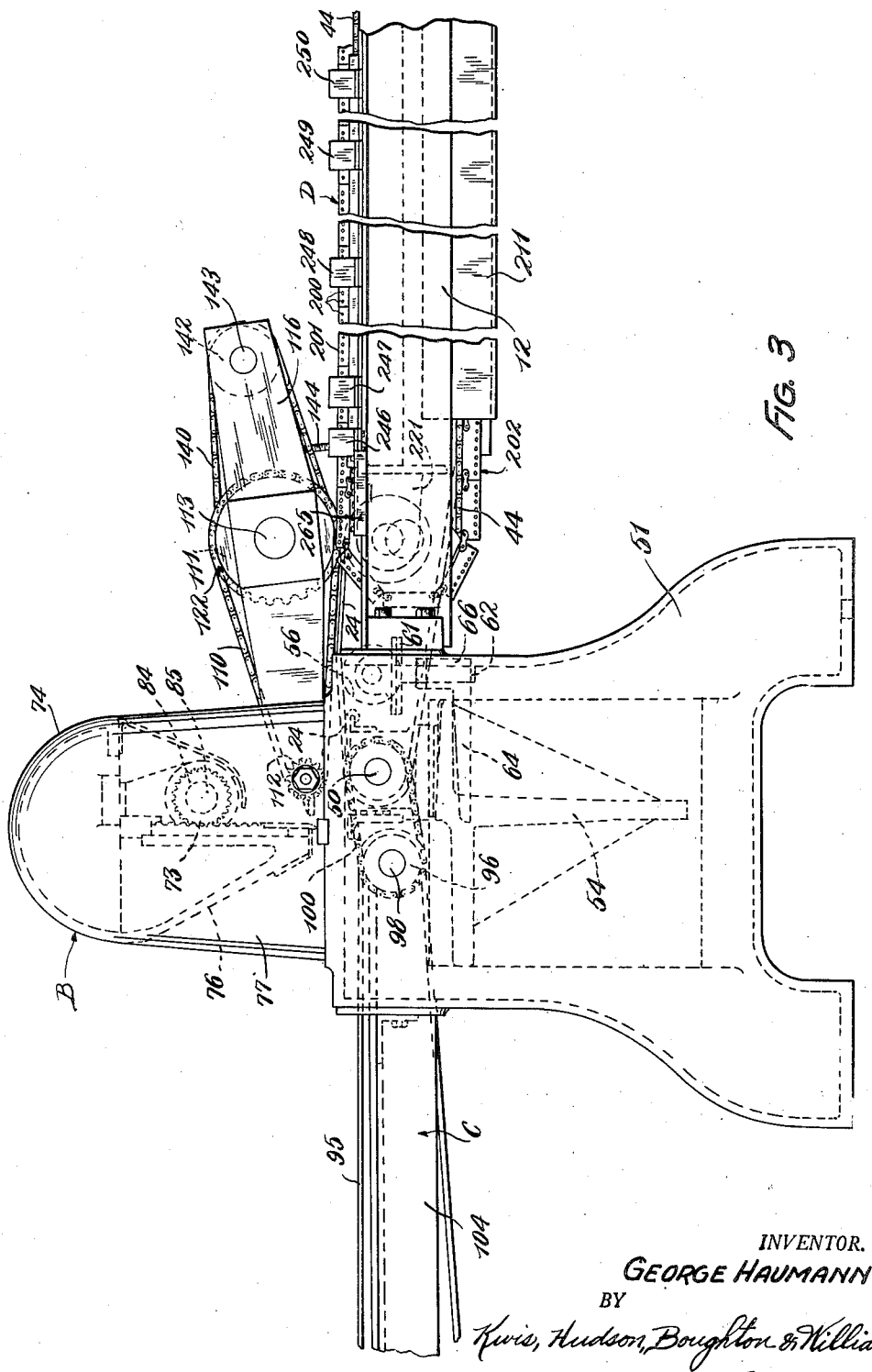
Fig. 3 is an enlarged, fragmentary, side elevational view of the clipper proper.

The shaft 85 is adapted to be oscillated to reciprocate the cutting blade or knife 70 by a double-acting, pressure fluid actuated motor 150 carried by the rear end member 52, as viewed in Figs. 2 and 3. The fluid pressure actuated motor 150 is of the reciprocating piston type and may be of any suitable commercial construction. Suffice it to say that the motor shown comprises a cylinder 151 provided with upper and lower cylinder heads 152, 153, respectively. The lower cylinder head 153 is pivotally connected, as by a pin 154, to a bracket 155 detachably bolted to the member 52. A piston 156 reciprocable within the cylinder 151 is connected to a piston rod 157, the upper end of which is pivotally connected by a yoke member 158 and a bolt 159 to links 160, 161.

The end of the link 160, other than the end pivotally connected to the upper end of the piston rod 157, is pivotally connected to a fixed pivot 162 carried by a bracket 163 bolted to the casting 74. The ends of the links 161, other than the ends pivotally connected to the piston rod 157, are pivotally connected to the free end of a yoke-like lever 164 keyed to the rear end of the transversely extending shaft 85 which operates the knife 70. The construction is such that as the piston 156 reciprocates in the cylinder 151 from either end to the other, the lever 164 is oscillated from the position shown in full lines in Fig. 9 to the position shown in dot-dash lines in the same figure and back again to starting position and the knife 70 caused to make one complete reciprocation.

The flow of pressure fluid to and from the motor 150 is controlled by a solenoid operated, four-way valve 165 of commercial construction; for example, a 6 DSM-4 double solenoid, momentary contact valve sold by Mumatics of Milford, Michigan. Suffice it to say that as one or the other of the solenoids 166, 167 is energized momentarily, the valve proper is shifted from one to the other of its positions admitting fluid to the end of the cylinder previously connected to exhaust and connecting to exhaust the opposite end of the cylinder which previously had been connected with the pressure fluid supply. The piston 156 of the fluid pressure motor 150 is so constructed that as it approaches opposite ends of its stroke, its movement is retarded and cushioned by entrapping fluid in the end toward which it is moving. This is accomplished by having the conduits 168, 169 which connect the motor with the valve, communicate with chambers 170, 171 in the cylinder heads 152, 153, respectively, which chambers, in turn, communicate with the interior of the cylinder 151 by apertures 172, 173, respectively. The piston rod 157 projects through the upper aperture 172 at all times and through the lower aperture when the piston is near the lower end of its stroke. The aperture 172 is slightly larger than the piston rod proper, allowing the pressure fluid to normally flow thereabout into the upper end of the cylinder 151. The apertures 172, 173 are closed so as to restrict the flow of pressure fluid from the cylinder into the chambers 170, 171, respectively, and, in turn, to exhaust, depending upon the direction in which the piston head 156 is moving, by enlargements 174, 175 on the piston rod adjacent to the piston, which enlargements in the embodiment shown are formed by sleeve members surrounding the piston rod and fixed thereto. The construction is such that the aperture 172 or 173, as the case may be, is closed shortly before the piston reaches the end of its stroke, thereby trapping fluid in the end of the cylinder toward which the piston is moving. The fluid thus trapped builds up a counterpressure which cushions the movement of the piston. The trapped fluid is allowed to escape through adjustable metering valves 176, one of which is located in each of the cylinder heads 152, 153 thereby permitting the piston to eventually seat against one or the other of the cylinder heads.

When one of the apertures 172 or 173 is closed because the piston is at one end or the other of its stroke and it is desired to admit pressure fluid into the closed end of the cylinder to move the piston toward the opposite end of the cylinder, the presure fluid is admitted behind the piston through one or the other of two check valves 177, 178 of well-known construction located in passages in the cylinder heads 152, 153, respectively, communicating with the chambers 170, 171 and the interior of the cylinder 151. The check valves permit pressure fluid to enter the ends of the cylinders from the chambers 170, 171 but do not allow the pressure fluid to flow from the cylinder into the chambers.

The solenoids 166, 167 of the four-way valve 165 are adapted to be selectively energized upon the closing of a normally open switch 180 by a single pole, double throw switch 181 in series circuit therewith and a source of electrical energy represented by the supply lines 182, 183, see wiring diagram. The switch 181 is connected to the rear end member 52 and includes an upwardly extending operating arm 184 adapted to be moved from one to the other of two normal positions to connect one or the other of the solenoids in the circuit. The switch 181 may be of any suitable commercial construction, such as, a "Snap-Lock" limit switch No. 16D-HL-1200 sold by The National Acme Company, Cleveland, Ohio. The operating arm 182 of switch 181 is adapted to be moved from one to the other of its two positions by cam means comprising two cam plates 185, 186 adjustable about the pivot 162 by cap screws extending through slots in the cam plates and threaded in tapped apertures in a holding plate 187 connected to the lever 160.

The construction is such that if the switch 180 is closed when the piston head 156 is at the upper end of the cylinder 151 with presure fluid applied to the lower end of the cylinder and the upper end open to exhaust, the four-way valve will be shifted to reverse the direction of flow of pressure fluid to the motor 150 and vice versa.

Figure 14:
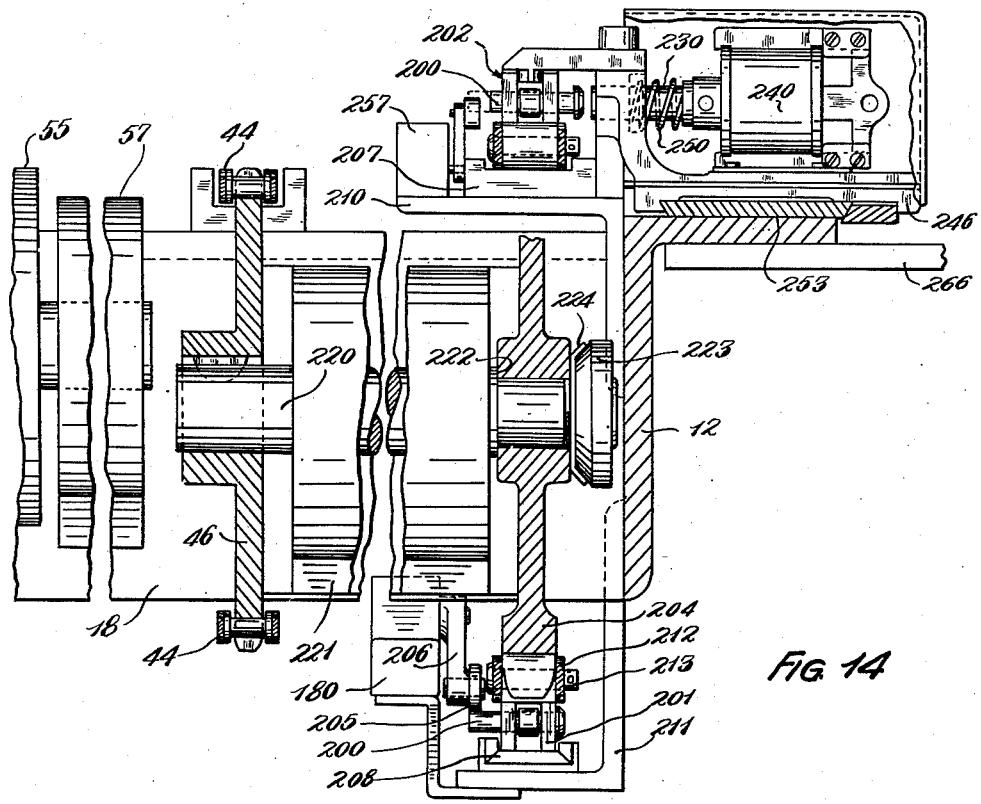
Fig. 14 is a sectional view, with portions in elevation, approximately on the line 14—14 of Fig. 13.

The closing of the switch 180 is controlled by a condition or signal on a flexible control member having a reach extending lengthwise of the strip of veneer being fed to the knife and drives in timed relation to the movement of the veneer. In the present embodiment this means comprises a plurality of pins 200 slidably supported in links 201 of a sprocket chain, designated generally by the reference character 202. In the embodiment shown, the links 201 are elongated and each link carries eight pins 200 slidably supported in suitable apertures therein for movement parallel to the axis of rotation of the sprocket wheels 203, 204 about which the sprocket chain 202 is looped. The pins 200 are provided with heads which limit their movement toward the left, as viewed in Fig. 14. Normally the pins are in the position occupied by most of the pins shown in the upper reach of the sprocket chain, see Fig. 12, with their rear ends confined within the links 201 of the sprocket chain. When pushed to the rear, they are in position to engage a roller 205 of the operating arm 206 of the switch 180 and close the contacts thereof while the pin is in engagement with the roller.

Figure 13:
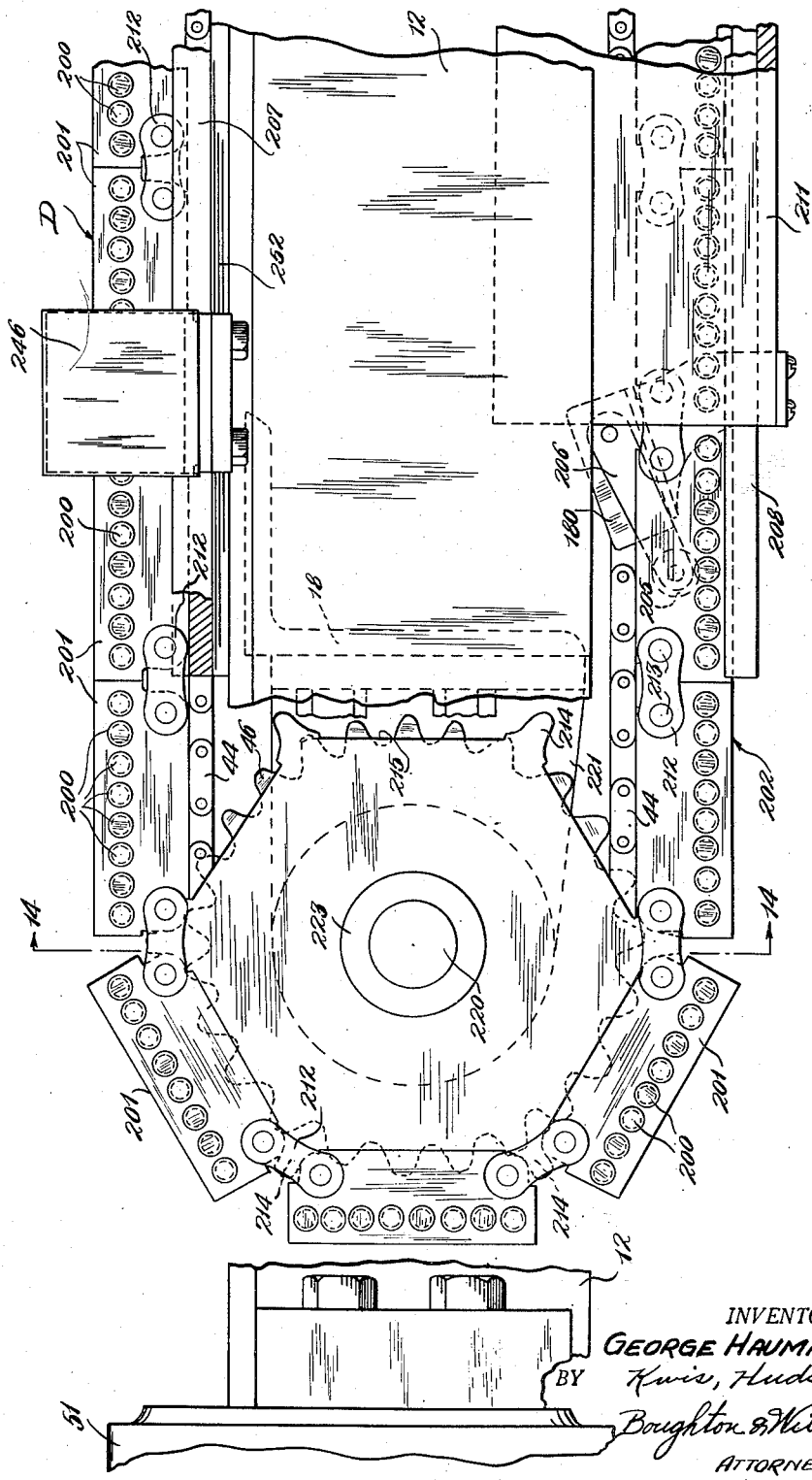
Fig. 13 is a fragmentary, side elevational view of the control mechanism shown in Fig. 12.

The upper and lower reaches of the sprocket chain 202 between the sprocket wheels 203, 204 are supported by channel members 207, 208 bolted or otherwise fixed to angle irons 210, 211 fixedly secured to the side frame member 12. The links 201 of the sprocket chain 202 are connected together by relatively short links 212 connected to the adjacent ends of adjoining links by pintle pins 213 held in position by cotter pins or the like. The sprocket wheels 203, 204 are hexagonal in shape and each comprises six sprocket teeth 214. The construction is such that the long links 201 engage the flat surfaces 215 on the sprocket wheels and the sprocket teeth engage between the pairs of short links 212 and intermediate adjacent ends of adjoining long links, which ends are slightly cut out, as shown in Fig. 13, to better receive the sprocket teeth 214.

The sprocket wheel 203 is rotatably supported by a bracket adjustably connected to the side frame 12 by screws 219 so that the tension on the chain can be adjusted. The sprocket wheel 204 is connected to one end of a shaft 220 upon the other end of which the sprocket wheel 46 is keyed. The shaft 220 is rotatably supported in a bracket 221 bolted to the left-hand side of the cross member 19 of the feed table. The sprocket wheel 204 is adjustably connected to the end of the shaft 220 by being clamped between a shoulder 222 on the shaft and a jam nut 223 threaded upon the end of the shaft. The jam nut 223 is tightened against the sprocket wheel 204 only a sufficient amount to cause the sprocket wheel to normally rotate with the shaft 220. In the event rotation of the sprocket wheel 204 is prevented by some abnormal condition in the clipper, the sprocket wheel 204 will slip upon the shaft 220. In the embodiment shown, a bronze washer-like wear plate 224 is interposed between the right-hand end of the hub of the sprocket wheel 204 and the jam nut 223.

The pins 200 are adapted to be moved to their rear or projecting position so as to engage the roller 205 and close the normally open switch 180 by solenoid-operated plungers 230 to 235 spaced along the sprocket chain 202. The operating solenoids for the plungers 230 to 235 are designated by the reference characters 240 to 245, respectively. The solenoids are fixed to brackets or housing 246 to 251 located at spaced intervals along the upper reach of the sprocket chain 202 and detachably secured to a plate 253 fixed to the top of the side member 12. The plungers in the embodiment shown are fixedly secured to the armature of the solenoid with which they are associated and operate to push one of the pins 200 into projecting position when the solenoids are energized. The plungers are normally held in inoperative position by springs 252 surrounding the same and interposed between a shoulder thereon formed by the connection between the plunger and its associated armature proper and the near side of an upstanding part of the bracket which carries the solenoid.

The sprocket chain 202 travels at the same speed as the belts 24 and, in turn, the veneer to be clipped and the location of the switch 180 with respect to the solenoid-operated plungers 230 to 235 is such that when that part of the veneer directly in line with one of the plungers at the time the solenoid associated therewith is energized reaches cutting position, the pin projected by the actuation of the solenoid will close the switch 180 and cause a reciprocation of the cutting knife 70.

The solenoid-operated plunger 230 is preferably located in a fixed position, which position is hereinafter referred to as the reference position and the other solenoid-operated plungers located at predetermined distances therebehind, referring to the direction of travel of the upper reach of the sprocket chain 202. The second solenoid-operated plunger 231 is spaced a short distance behind the solenoid-operated plunger 230 such that if both plungers are simultaneously projected, two pins 200 relatively close together will be pushed out of the sprocket chain, which pins will subsequently cause the narrow piece of veneer therebetween at the time their respective solenoids are energized to be cut from the strip. The third, fourth, fifth and sixth solenoid-operated plungers 232, 233, 234, 235 are preferably spaced 24″, 36″, 48″ and 60″ behind the first solenoid-operated plunger 230 or the reference position.

The energizing circuit for the solenoid 240 includes a manually operated push button switch 254 which, in addition to being in series circuit across the supply lines 182, 183 with the solenoid 240, is in series circuit with a timing relay 255 which opens the circuit after a very short interval; for example, after two cycles, even though the switch 254 may be held closed for a much longer period. The timing relay is for the purpose of preventing the solenoid 240 from operating upon more than one pin 200 for each actuation of the manual switch 254. The timing switch is preferably such that it maintains the circuit open until the operator has released the push button switch 254 and may be of any suitable commercial construction, such as, a "Weldmaster" timer "NEMA Type 1" sold by The Clark Controller Company, Cleveland, Ohio. Energization of the solenoid 241, hereinafter referred to as the double-cut solenoid, is controlled by a manual push button switch 256 connected in series circuit with the solenoid 241. The solenoid 241 and the push button switch 256 are connected in shunt circuit with the solenoid 240, the construction being such that the solenoid 241 can only be energized simultaneously with energization of the solenoid 240. In operation, both push button switches 254, 256 must be simultaneously depressed or the push button switch 256 must be closed prior to the closing of push button switch 254 because of the short period of time that solenoid 240 remains energized if two pins are to be simultaneously moved to operative position by the plungers associated with the solenoids 240, 241.

The present invention also contemplates means for automatically energizing a selected one of the solenoids 242, 243, 244, 245 to cut the veneer into predetermined widths and the periodic energization of the selected solenoid may be continuous or under the control of the operator. For automatically energizing a selected one of the solenoids 242 to 245, a normally open limit switch 257 is secured to the bracket 246 in position to be closed by a pin 200, the end of which has been projected outwardly from the sprocket chain. The switch 257 is in series circuit across the supply lines 182, 183 with a normally closed limit switch 258, hereinafter referred to, a timing relay 259 similar to the timing relay 255 previously referred to, a five position selecting switch 260 or a plurality of manually controlled, normally open push button switches 261, 262, 263, 264, and a selected one of the aforementioned solenoids. The switches 261, 262, 263, 264 are in series circuit with the solenoids 242, 243, 244, 245, respectively. Any one of the switches 261 to 264 may be shorted or shunted out of the circuit and a circuit maintained therearound by the multiple position selector switch 260. The switches 254, 256, 260 to 264 are grouped together on a control panel 265 located at the operator's position and connected to the side member 12 of the feed table adjacent to the clipper proper by a member 266.

The switches 257, 258 are fixed to the forward end of the angle iron 210 and the normally closed switch 258 which is in series circuit with the normally open switch 257 is so positioned with respect to the sprocket chain 220 that it will be opened by the trailing one of two double-cut pins projected by simultaneous energization of the solenoids 241, 242 simultaneously with the closing of switch 257 by the leading pin. With the switch 258 open, the closing of the switch 257 has no effect insofar as energization of the solenoids 242 to 245 are concerned, otherwise a veneer strip of improper width would be cut.

Figure 15:
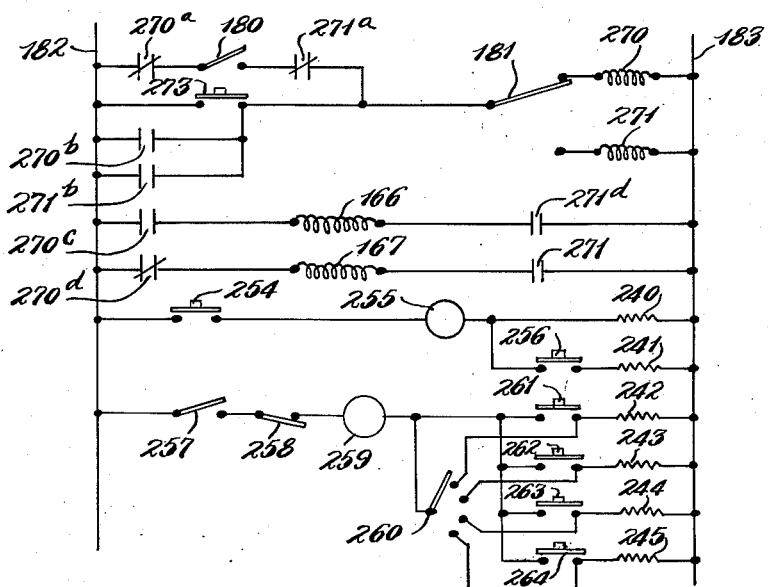
Fig. 15 is a schematic wiring diagram of the electrical circuits of the veneer clipper.
Figure 16:
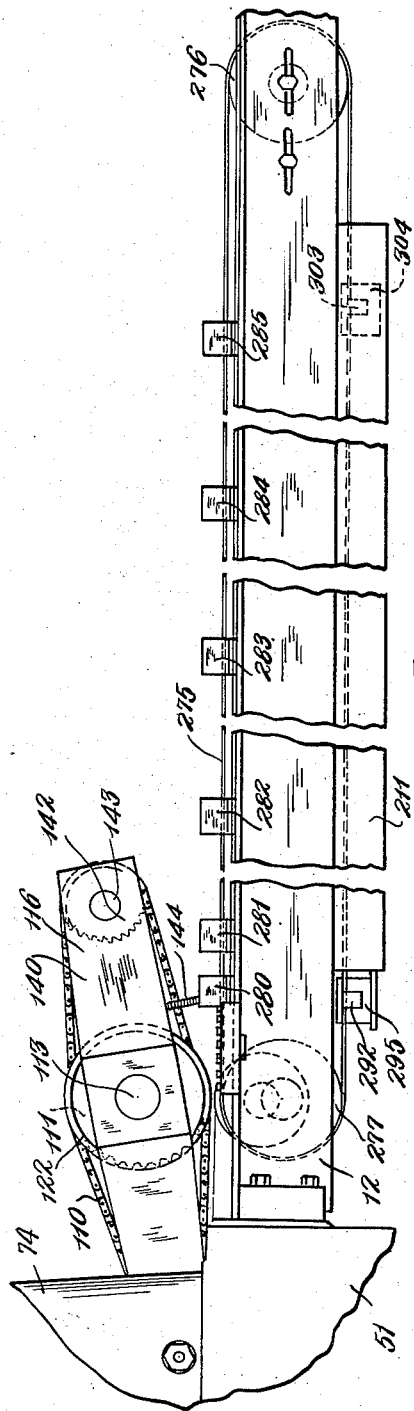
Fig. 16 is a fragmentary side elevational view of the clipper, but showing an alternative form of control mechanism.
Figure 17:
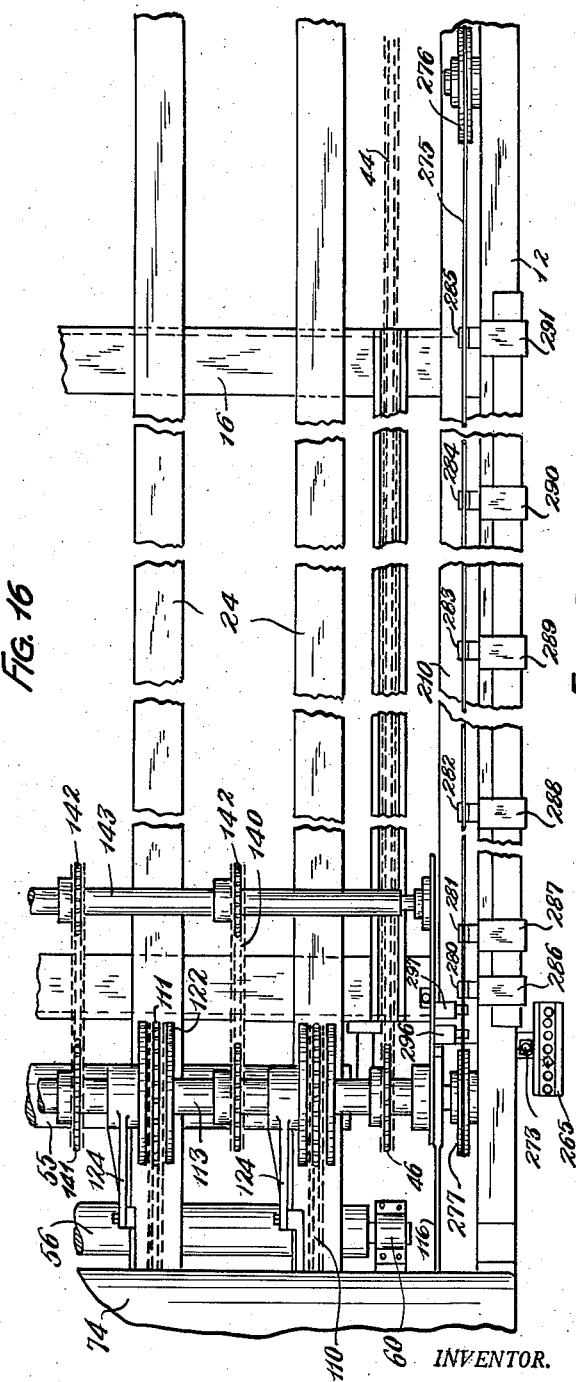
Fig. 17 is a fragmentary plan view of the clipper shown in Fig. 16.
Figure 18:
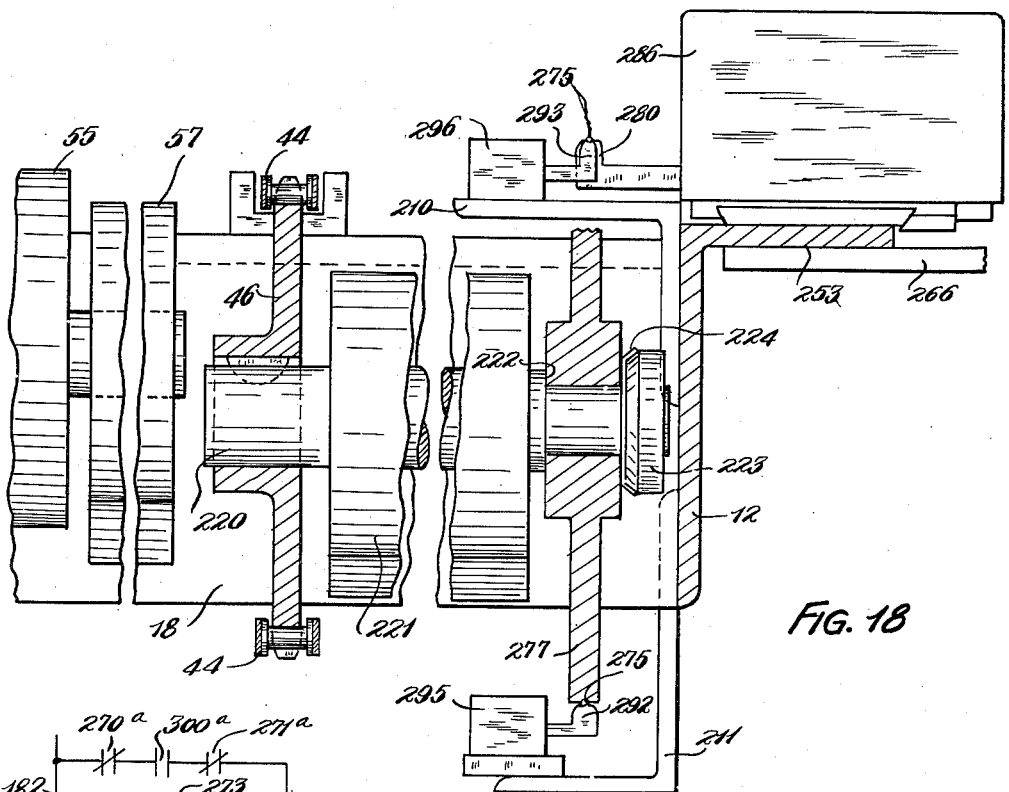
Fig. 18 is a fragmentary view similar to Fig. 14 but showing portions of the alternative control mechanism principally in elevation with portions in section.

As previously stated, the solenoids 166, 167 which shift the fluid pressure control valve 165 are energized only instantaneously upon the closing of the switch 180. Reference to Fig. 15, the schematic wiring for the machine, will show that the switch 181 which selects the solenoid to be energized, is not directly connected in the solenoid circuits but that the energization of the solenoids is controlled by the switch 181 through two relays 270, 271 adapted to be selectively connected in series circuit across the supply lines 182, 183 with the switch 180 by the switch 181. The relays 270, 271 are employed so that electrical interlocks may be used to effect energization of the solenoids only for an instant even though the switch 180 may be held closed for a considerable length of time and to prevent repeated energization of one or the other of the solenoids in the event two or more pins 200 are accidentally projected from the sprocket chain for a given operation of one of the solenoids 240 to 245.

As will be hereinafter apparent, after the switch 180 has been closed, subsequent opening and closing thereof has no affect on the solenoid circuits until the piston of the motor 150 has completed its travel from one end of the cylinder to the other. This result is brought about by a pair of normally closed contacts 270a and a pair of normally open contacts 270b on relay 270 and similar pairs of normally closed and normally open contacts 271a and 271b on relay 271. The normally closed contacts 270a, 271a are in series circuit with the switch 180, thereby maintaining the circuit open while either of the relays is energized. The relays are held energized upon the closing of the switch 180 irrespective of whether the switch is subsequently opened and closed until the selector switch 181 is moved to its opposite position by the normally open contacts 270b and 271b, both of which are in shunt circuit about a manually operable push button switch 273 in series with the selector switch 181 and in shunt circuit with the switch 180 and the contacts 270a and 271a. The manually operable switch 273 which is located at the operator's position on the member 266 permits the fluid pressure actuated motor 150 to be operated at will by the operator. When either switch 180 or 273 is closed with both relays 270, 271 deenergized and the solenoid selecting switch 181 in the position shown in the wiring diagram, relay 270 is energized and, in turn, solenoid 166 by the closing of a normally open pair of contacts 270c, which contacts are closed upon energization of the operating solenoid of the relay. The contacts 270c are in series circuit across the supply lines 182, 183 not only with the solenoid 166 but with the pair of normally closed contacts 271d of relay 271, which contacts prevent energization of the solenoid 166 while the operating solenoid of relay 271 is energized. In like manner, the solenoid 167 is energized upon the closing of either switch 180 or 273 when the solenoid selecting switch 181 is in the other of its two positions by the normally open contacts 271c in series circuit across the supply lines 182, 183 with the solenoid 167 and normally closed contacts 270d of relay 270 which correspond with the normally closed contacts 271d of relay 271.

*Operation*

The operation of the clipper will be readily apparent from the foregoing description. Suffice it to say that with the drive motor 32 in operation, veneer will be moved along the feed table A by the belts 24, through the clipper proper B underneath the knife 70, and along the run-out table C by the belts 95. The operator stands at a position adjacent the push button switches 254, 256 and 260 to 264 so that he can watch the veneer and cause sections of desired width to be cut. The clipper can be manually controlled to cut sections of any desired random width from the strip of veneer by the push button switch 254 or can be automatically controlled to cut sections of any predetermined width; for example, 24", 36", 48" or 60" by setting the selector switch 160 to the desired position or by manually closing the proper push button switch of the push button switches 261 to 264, respectively. Other lengths may be cut by adjusting the brackets 248 to 251 to the proper position.

Upon each energization of one or the other of the solenoids 166, 167 by the closing of the switch 180 or the switch 273 and actuation of their associated relays, etc., the piston 156 of the motor 150 is moved from one end of the cylinder 151 to the other depending upon the position of the piston and the switch 181 at the start of the operation. As the piston of the motor 150 moves from one end of the cylinder to the other, the shaft 25 is oscillated by the crank-arm 164 and the links, etc., associated therewith. The crankarm 164 moves from the position shown in full lines in Fig. 9 to the position shown in dot-dash lines, and back again to the full line position, thus causing the knife 70 to make one stroke and return to starting position. The knife 70 and its operating mechanism is relatively light and has a small inertia which permits it to be reciprocated very rapidly.

While the knife 70 is cutting through the veneer, the travel of the veneer immediately in front of the knife is interrupted for a very short period; however, the veneer merely humps up a small amount in advance of the knife because of the hump-up roller 56. If it were not for the hump-up roller, the veneer might be pushed back along the feed table and its position with respect to the timing or sprocket chain 44 and the control sprocket chain 202 altered, which cause the next cut to occur at an improper position, assuming that one or more pins 200 had been projected from the sprocket chain 202 in the interim between the projection of the pin 200 then causing the operation of the knife and the actual cut. As the veneer approaches the knife 70, it is held in contact with the belts 24 so that it will travel therealong at the same speed as the belts by the holddown mechanism including the sprocket chain 110 and the sprocket wheels 111 and their associated flanged members 122 but the hold-down mechanism permits the veneer to hump-up without damage since it is pivoted about the short shafts 120.

*Modification*

Figs. 16 to 19 show a modified means for controlling the energization of the solenoids 166, 167 and, in turn, the operation of the clipper knife, which means may be substituted for the control means shown in Figs. 1 to 15 heretofore described.

Referring to Figs. 16 to 19, the flexible control member, that is, the control chain 202 and the sprocket wheels 203, 204 about which it is looped, employed in the embodiment already described, are replaced by a continuous magnetizable wire 275 similar to that employed in commercial wire recorders, looped about suitable pulleys 276, 277 which replace the sprocket wheels 203, 204, respectively; the plungers 230 to 235 and their operating solenoids 240 to 245 are replaced by magnetizing heads 280 to 285 and suitable operating mechanism 286 to 291, respectively; and the switches 180, 257, 258 are replaced by magnetic pick-up heads 292, 293, 294, respectively, operatively connected through suitable electronic amplifying mechanism 295, 296, 297 to relays 300, 301, 302, respectively. Relays 300, 301 have normally open contacts 300a, 301a, respectively, located in the control circuit in the same position as the normally open switches 180, 257 of the previous embodiment and relay 302 has a pair of normally closed contacts 302a located in the control circuit in the same position as that previously occupied by the normally closed contact of switch 258. Except as herein noted, the control circuits for both embodiments are the same and the duplicate parts are designated by the same reference characters.

The magnetizing heads 280 to 285 and their associated mechanism 286 to 291 and the magnetic pick-up heads 292 to 294 and their associated mechanism 295 to 297 may be of any suitable commercial construction, that is, similar to those employed in commercial wire or tape recorders, such as, a "Webster Model 80," and are not herein shown and described in detail. Suffice it to say that the magnetizing heads 280 to 285 and their associated mechanism 286 to 291 are suitably modified and connected in the circuit employed in the original embodiment in the place previously occupied by the solenoids 240 to 245, respectively, and the energization thereof is controlled by the switches 254, 256 and 261 to 264 in place of microphones.

Figure 19:
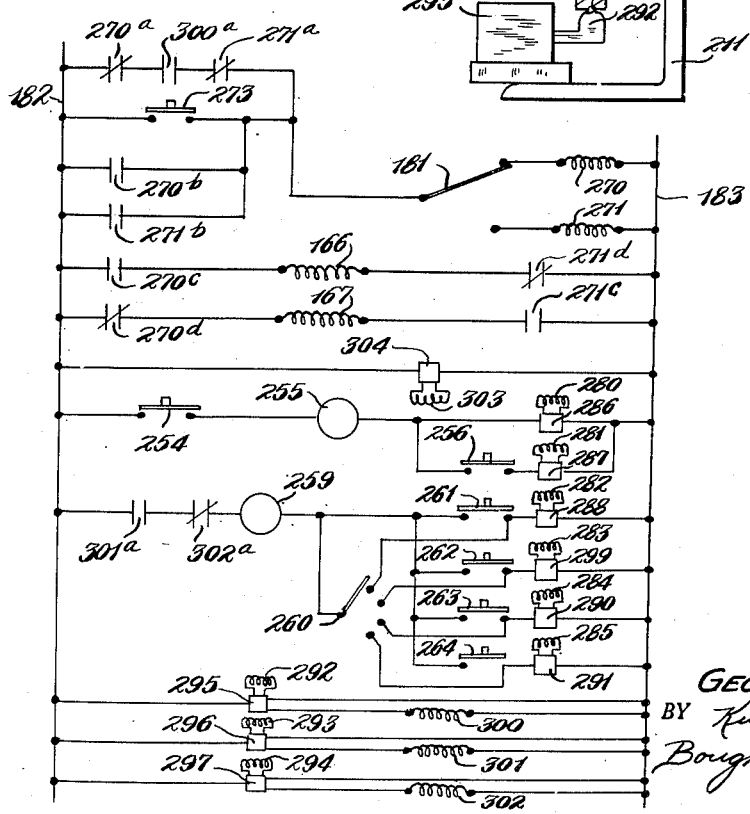
Fig. 19 is a schematic wiring diagram of the electrical circuits of the clipper shown in Figs. 16 to 18.

Reference to Fig. 19 will show that upon the closing of any one of the switches 254, 256, 261 to 264, a selected one of the magnetizing heads will be momentarily energized to magnetize a short section of the wire 275 immediately adjacent thereto. As the wire travels about the pulleys 276, 277, the magentized portions travel by the magnetic pick-up heads 294, 293, 292 in the order mentioned. Energization of the magnetic head 294 will cause the relay 302 associated therewith to open its normally closed contacts 302a but no further function is effected. Subsequent energization of the magnetic head 293 by the same portion of the wire 275 will cause relay 301 associated therewith to close its normally open contacts 301a, thus energizing one of the magnetizing heads 282 to 285 in the event the selector switch 260 is set on one of its "on" positions or if one of the manual push button switches 261 to 264 is closed. If both manual push buttons 254, 256 had previously been simultaneously depressed to cause the clipper to cut a short section from the moving strip of veneer, the leading magnetized portion of the wire 275, that is, the portion magnetized by the magnetizing head 280 will actuate the relay 301 to close the normally open contacts 301a thereof as the magnetized portion of the wire passes by the pick-up head 293 and simultaneously the trailing magnetized section of the wire 275, that is, the section which was magnetized by the magnetizing head 281 simultaneously with the magnetizing of the leading magnetized portion by the head 280 will energize the relay 302 associated with the pick-up head 293 to open the normally closed contacts 302a while the contacts 301a are closed, thus preventing energization of any of the magnetizing heads 282 to 285 regardless of the position of the selector switch 260 or the manual push button switches 261 to 264. As the magnetized portions of the wire 275 pass by the pick-up head 292, they cause the relay 300 to close its normally open contacts 300a which, in turn, energize one or the other of the relays 270, 271 depending upon the position of the switch 181, which relays, in turn, energize one or the other of the solenoids 166, 167, all as previously described.

An eraser head 303 and the necessary operating mechanism therefor, designated generally by the reference character 304, are continuously connected across the supply lines 182, 183. The head 300 is located in advance of the magnetizing head 285 and removes any magnetism in the wire 275 as it approaches the magnetizing heads. Like the magnetizing and pick-up heads, the eraser head and its associated mechanism may be of any commercial construction and is not shown or described in detail.

From the foregoing description of the preferred embodiment of the invention, it will be apparent that the objects of the invention heretofore enumerated and others have been accomplished and that there has been provided a novel and improved clipper for cutting veneer which is simple in construction, reliable in operation, and can be readily controlled to cut defective sections from a continuously moving strip of veneer or to cut the veneer in predetermined lengths either manually or automatically. While the preferred embodiment of the invention has been described in considerable detail, the invention is not limited to the particular construction shown, and it is my intention to cover hereby all adaptations, modifications and uses which come within the practice of those skilled in the art to which the invention relates and the scope of the appended claims.

Having thus described my invention, I claim:

1. In a high speed veneer clipper of the character referred to, a rigid frame comprising horizontally spaced vertical side members, a long vertically movable knife supported by said frame, said knife being thin and light-weight relative to said frame, power means for reciprocating said knife, a feed table for moving veneer to cut past said knife, and means raising a portion of the veneer adjacent to said knife above the normal plane of said feed table.

2. In a high speed veneer clipper of the character referred to, a frame comprising horizontally spaced rigid vertical side members and a rigid cross member extending between said side members, a long vertically movable knife slidably supported by said cross member, said knife being thin and light-weight relative to said cross member, a feed table for feeding veneer past said knife, said knife having the lower edge thereof beveled on the side from which the veneer is fed, means for reciprocating said knife, and means raising a portion of the veneer adjacent to the feed side of the knife above the normal plane of the feed table.

3. In a high speed veneer clipper of the character referred to, a rigid frame comprising horizontally spaced vertical side members and spaced rigid head or crown and bed members extending between said side members providing an opening for the passage of veneer through said frame above said bed member and below said head member, a long vertically movable knife slidably supported by said head member, the said knife being thin and light-weight relative to said head member, a stationary member supported by said bed member for cooperation with said knife to cut veneer passing beneath said knife, power means for reciprocating said knife, a feed table for moving veneer to be cut through said frame beneath said knife, and means raising a portion of the veneer adjacent to said knife above the upper surface of said stationary member.

4. In a high speed veneer clipper of the character referred to, a rigid frame comprising horizontally spaced vertical side members, a long vertically movable knife, said knife being thin and light-weight relative to said frame, supporting means connected to said knife and slidable upon a portion of said frame, means for reciprocating said knife including a rotatable shaft operatively connected to said supporting means for imparting straight line movement thereto while maintaining said supporting means in engagement with the said portion of the frame, a lever connected to said shaft, a pair of pivoted links connected to the free end of said lever and to a fixed pivot on said frame, a reciprocating type motor connected to the center pivot for said links, and means for connecting said motor with a source of energy whereby it is reciprocated selectively in opposite directions.

5. In a high speed veneer clipper of the character referred to, a frame comprising horizontally spaced rigid vertical side members and vertically spaced transverse rigid head or crown and bed members extending between said side members providing an opening for the passage of veneer through said frame above said bed member and below said head member, a long vertically movable knife said knife being thin and light-weight relative to said head member, supporting means connected to said knife and slidable upon a portion of said head member, means for reciprocating said knife including a rotatable shaft operatively connected to said supporting means for imparting straight line movement thereto while maintaining said supporting means in engagement with the said portion of said head member, a lever connected to said shaft, a pair of pivoted links connected to the free end of said lever and to a fixed pivot on said frame, a reciprocating type fluid pressure actuated motor operatively connected to the center pivot for said links, and means for selectively connecting opposite ends of said fluid pressure actuated motor with a source of fluid pressure and with exhaust.

6. In a high speed veneer clipper of the character referred to, a rigid frame comprising horizontally spaced vertical side members, a knife movably supported by said frame, means for feeding strip veneer past said knife, power means for reciprocating said knife, a movable control member having parts to which a condition or signal may be imparted and moved in endless succession when said control member is moved, means for moving said control member in timed relation to the movement of the veneer, means including a control element located adjacent to said control member for controlling said power means, an electrically actuated member located adjacent to said control member and operating when energized to impart a condition or signal to individual ones of said parts of said control member for actuating said control element as said control member passes thereby, means including a device adjacent to said control member and actuated by a conditioned part of said control member for energizing said electrically actuated member whereby a condition is imparted to individual parts of said control member at predetermined intervals in said succession of parts during movement of said control member, a second electrically actuated member operative when energized to impart a condition or signal to individual ones of said parts of said control member as said parts move thereby and located between the first mentioned electrically actuated member and said control element, and means to energize said second electrically actuated member independently of conditioned parts of said control member and the first mentioned electrically actuated member and comprising a circuit including a manually operated switch.

7. In a high speed veneer clipper of the character referred to, a rigid frame comprising horizontally spaced vertical side members and a vertical member extending between said side members, a knife movably supported by said vertical member, means for feeding strip veneer past said knife, power means for reciprocating said knife, a flexible control member having a reach extending lengthwise of a strip of veneer being fed past said knife and having parts to which a condition or signal may be imparted, means for moving said flexible control member in predetermined relation to the movement of the veneer, means including a control element located adjacent to said flexible member for controlling said power means, a plurality of electrically actuated members spaced along said reach of said flexible member extending lengthwise of the veneer being fed to said knife, the said electrically actuated members each operating when energized to impart a condition or signal to said flexible member for actuating said control element after a predetermined time as it passes thereby, means including a manual switch for selectively energizing one of said electrically actuated members which is located between said control element and another of said electrically actuated members independently of said control member and said parts thereof, and means including a device adjacent to said control member and actuated by conditioned parts of said control member to energize said other electrically actuated member whereby said parts of said control member are conditioned automatically at predetermined intervals in response to preceding conditioned parts as said control member moves relative to said control element.

8. In a high speed veneer clipper of the character referred to, a rigid frame comprising horizontally spaced vertical side members, a knife movably supported by said frame, means for feeding strip veneer past said knife, power means for reciprocating said knife, a flexible control member having a reach extending lengthwise of a strip of veneer being fed to said knife to which a condition or signal may be imparted, means for moving said flexible control member in predetermined relation to the movement of the veneer, means including a control element located adjacent to said flexible control member for controlling said power means, a plurality of electrically actuated members spaced along said reach of said flexible control member extending lengthwise of the veneer being fed to said knife the said electrically actuated members each operating when energized to impart a condition or signal to said flexible member for actuating said control element as it passes thereby, means including a manual switch for instantaneously energizing one of said electrically actuated members, which is located between said control element and another of said electrically actuated members independently of said control member and said parts thereof, and means including a device automatically actuated by a condition or signal on said flexible member as it passes thereby for momentarily energizing said other of said electrically actuated members whereby successive parts of said flexible member are conditioned at predetermined intervals as said reach thereof approaches said control member.

9. In a high speed veneer clipper of the character referred to, a rigid frame comprising horizontally spaced vertical side members, a knife movably supported by said frame, means for feeding strip veneer past said knife, power means for reciprocating said knife, a flexible control member having a reach extending lengthwise of a strip of veneer being fed to said knife, means for moving said flexible control member in predetermined relation to the movement of the veneer, means including a control member located adjacent to said flexible control member for controlling said power means, a plurality of electrically operated members spaced along said reach of said flexible control member extending lengthwise of the veneer being fed to said knife for imparting a condition or signal to said flexible member for actuating said control member as it passes thereby, means including a manual switch for instantaneously actuating one of said electrically operated members, means including a second manual switch for instantaneously actuating another of said electrically operated members simultaneously with the actuation of said first-mentioned electrically operated member, means including a device automatically operated by a condition or signal on said flexible member as it passes thereby for instantaneously actuating one of said electrically operated members, and means for rendering said last-named means inoperative when actuated by the first of two signals simultaneously imparted to said flexible control member by said first and second-mentioned electrically operated members.

10. In a high speed veneer clipper of the character referred to, a rigid frame comprising horizontally spaced vertical side members, a knife movably supported by said frame, means for feeding strip veneer past said knife, power means for reciprocating said knife, a flexible control member having a reach extending lengthwise of a strip of veneer being fed to said knife, means for moving said flexible control member in predetermined relation to the feed of the veneer, means including a control element located adjacent to said flexible control member for controlling said power means, a plurality of trip members carried by said flexible member and movable relative thereto into an operating position where they actuate said control element as they pass thereby, a plurality of movable members located along said reach of said flexible control member extending lengthwise of the veneer being fed to said knife, said movable members being engageable with said trip members for moving the latter into operative position, individual electromagnetic means cooperating with the respective movable members to effect movement thereof, means including a manually operated switch to selectively energize the electromagnetic means for moving the movable member nearest to said control member independently of the other of said electromagnetic means and independently of said flexible control member, and means to control energization of another of said electromagnetic means comprising means responsive to a tripped member on said flexible control member to automatically move another of said movable members to set trip members of said flexible member at predetermined intervals along said reach of said flexible member, and means including a manual switch for momentarily energizing said electromagnetic means.

11. In a high speed veneer clipper of the character referred to, a rigid frame comprising horizontally spaced vertical side members, a knife movably supported by said frame, means for feeding strip veneer past said knife, power means for reciprocating said knife, a flexible control member having a reach extending lengthwise of a strip of veneer being fed to said knives, means for moving said flexible control member in predetermined relation to the feed of the veneer, means including a control member located adjacent to said flexible control member for controlling said power means, a plurality of trip members carried by said flexible member and movable relative thereto into an operating position where they actuate said control member as they pass thereby, a plurality of electrically operated members spaced along said reach of said flexible control member extending lengthwise of the veneer being fed to said knife for moving said trip members into operative position, means for instantaneously actuating one of said electrically operated members, means for instantaneously actuating one of said electrically operated members simultaneously with the actuation of said first-mentioned electrically operated member, means including a switch automatically operated by a trip member in operating position passing thereby for instantaneously actuating one of said electrically operated members, and means including a second switch automatically operated by a trip in operating position for rendering said last-named means inoperative when actuated by the first of two trip members simultaneously moved to operating position by said first and second-mentioned electrically operated members.

12. In a high speed veneer clipper of the character referred to, a rigid frame comprising horizontally spaced vertical side members, a knife movably supported by said frame, means for feeding strip veneer past said knife, power means for reciprocating said knife, a flexible magnetizable endless control member having a reach extending lengthwise of a strip of veneer being fed to said knife, means for moving said flexible control member in predetermined relation to the feed of the veneer, means including a control member located adjacent to said flexible control member for controlling said power means, an electrically operated member located along said reach of said flexible control member extending lengthwise of the veneer being fed to said knife for magnetizing a portion of said flexible member for actuating said control member as it passes thereby, and means for instantaneously actuating said electrically operated member.

13. In a high speed veneer clipper of the character referred to, a rigid frame comprising horizontally spaced vertical side members, a knife slidably supported by said frame, means for feeding strip veneer past said knife, power means for reciprocating said knife to clip veneer passing thereby, a sprocket chain having a reach extending lengthwise of a strip of veneer being fed to said knives, means for moving said sprocket chain in predetermined relation to the feed of the veneer, a plurality of transversely slidable pins carried by said sprocket chain, means including a control member located adjacent to said sprocket chain and adapted to be actuated by said pins for controlling said power means, a plurality of plungers spaced along said reach of said sprocket chain extending lengthwise of the veneer being fed to said knife adapted to be actuated to move a selected one of said pins carried by said sprocket chain, an electromagnetic means cooperating with each of said plungers to effect movement thereof, and means for momentarily energizing said electromagnetic means.

14. In a high speed veneer clipper of the character referred to, a frame comprising horizontally spaced vertical side frames and vertically spaced rigid head or crown and bed members extending between said side frames providing an opening for the passage of veneer through said frame above said bed and below said head, a plurality of horizontally spaced relatively light-weight reciprocable members slidably supported by said head or crown member, a relatively long thin light-weight knife carried by said reciprocable members, a stationary member supported by said bed member for cooperation with said knife, means including a rotatable shaft for moving said reciprocable members, a lever connected to said shaft, a pair of pivoted links connected to the free end of said lever and to a fixed pivot on said frame, a reciprocating type fluid pressure actuated motor operatively connected to the center pivot for said links, solenoid operated valve means for selectively connecting opposite ends of said fluid pressure actuated motor with a source of fluid pressure and with exhaust, means for feeding veneer underneath said knife, said means comprising an endless conveyor at one side of said bed member, means for moving said conveyor, means for raising a portion of the veneer adjacent to said knife above the upper surface of said stationary member and the normal plane of said conveyor, hold-down mechanism above said conveyor comprising a pair of end members pivoted to said frame and connected intermediate their ends by a transverse member, a plurality of wheels carried by said transverse member, a plurality of longitudinally extending members pivoted to said transverse member and projecting toward said knife, wheels at the free ends of said longitudinally extending members, a plurality of endless bands encircling a plurality of said wheels on said transverse member and said last-mentioned wheels, a second transverse member extending between said end members and connecting the free ends thereof, a plurality of wheels on said last-mentioned transverse member, a plurality of endless bands encircling a plurality of said wheels on said transverse members, a flexible member having a reach extending lengthwise of said endless conveyor, means for moving said flexible member in predetermined relation to the movement of said conveyor, means including a control member adjacent to said flexible member for controlling the energization of said solenoids, an electrically operated member located along the reach of said flexible member for imparting a condition or signal to said flexible member for actuating said control member as it passes thereby, and means for momentarily actuating said electrically operated member.

GEORGE HAUMANN.

REFERENCES CITED

The following references are of record in the file of this patent:

UNITED STATES PATENTS

| Number | Name | Date |
|---|---|---|
| 1,106,026 | Barber | Aug. 4, 1914 |
| 1,611,177 | Fenlason | Dec. 21, 1926 |
| 1,714,382 | Lebovitz | May 21, 1929 |
| 1,727,307 | Robinson | Sept. 3, 1929 |
| 1,841,853 | Stanley | Jan. 19, 1932 |
| 2,320,659 | Sahlin | June 1, 1943 |
| 2,325,139 | Leguillon | July 27, 1943 |
| 2,379,682 | Colucci | July 3, 1945 |
| 2,394,324 | Miller | Feb. 5, 1946 |
| 2,394,558 | Miller | Feb. 12, 1946 |
| 2,452,402 | Stringe | Oct. 26, 1948 |